(12) United States Patent
Rundle et al.

(10) Patent No.: US 11,030,334 B2
(45) Date of Patent: *Jun. 8, 2021

(54) COMPARTMENT-BASED DATA SECURITY

(71) Applicant: Baker Hughes, a GE company, LLC, Houston, TX (US)

(72) Inventors: Robert Rundle, Albuquerque, NM (US); Nicolaas Pleun Bax, Houston, TX (US); Michelangelo Partipilo, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 130 days.

This patent is subject to a terminal disclaimer.

(21) Appl. No.: 16/266,743

(22) Filed: Feb. 4, 2019

(65) Prior Publication Data

US 2019/0180045 A1  Jun. 13, 2019

Related U.S. Application Data

(63) Continuation of application No. 14/595,763, filed on Jan. 13, 2015, now Pat. No. 10,242,222.

(Continued)

(51) Int. Cl.
 *G06F 21/62* (2013.01)
(52) U.S. Cl.
 CPC ...... *G06F 21/6227* (2013.01); *G06F 21/6218* (2013.01); *G06F 2221/2113* (2013.01); *G06F 2221/2145* (2013.01)
(58) Field of Classification Search
 CPC .. G06F 21/6218; G06F 21/6227; G06F 21/62; G06F 2221/2113; G06F 2221/2141

(Continued)

(56) References Cited

U.S. PATENT DOCUMENTS

| 5,680,452 A | 10/1997 | Shanton |
| 6,112,024 A | 8/2000 | Almond et al. |

(Continued)

FOREIGN PATENT DOCUMENTS

| WO | 2008103783 A2 | 8/2008 |
| WO | 2015108922 A1 | 7/2015 |

OTHER PUBLICATIONS

Corwin et al.; "Dynamic Tables: An Architecture for Managing Evolving, Heterogeneous Biomedical Data in Relational Database Management Systems"; Application Information Technology; J. Am. Med. Inform. Assoc.; vol. 14, No. 86-93; 2007; pp. 86-93.

(Continued)

*Primary Examiner* — Robert W Beausoliel, Jr.
*Assistant Examiner* — Pedro J Santos
(74) *Attorney, Agent, or Firm* — Cantor Colburn LLP

(57) ABSTRACT

An embodiment of a method for securing stored data includes assigning a first user security label to a first user. The method further includes adding an object compartment created by the first user to the first user security label assigned to the first user. The method further includes assigning the object compartment to an object created by the first user by creating the object compartment in an object security label. The method further includes enabling a second user to access to the object created by the first user by assigning the object compartment assigned to the object to a second user security label of a second user. The method further includes determining, by a processing device, whether to permit the second user to access to the object based at least in part on the object security label and the second user security label.

15 Claims, 5 Drawing Sheets

Related U.S. Application Data

(60) Provisional application No. 61/927,042, filed on Jan. 14, 2014.

(58) Field of Classification Search
USPC .......................... 707/999.009, 781, 783, 784
See application file for complete search history.

(56) References Cited

U.S. PATENT DOCUMENTS

| | | |
|---|---|---|
| 6,154,747 A | 11/2000 | Hunt |
| 6,694,304 B1 | 2/2004 | Sethi |
| 7,209,933 B2 | 4/2007 | Saxena |
| 7,369,279 B2 | 5/2008 | Van Oosterhout |
| 8,255,373 B2 | 8/2012 | McKelvie et al. |
| 9,305,033 B2 | 4/2016 | Scheevel et al. |
| 9,465,877 B2 | 10/2016 | Hunter |
| 2002/0023180 A1 | 2/2002 | Klimczak et al. |
| 2002/0177437 A1 | 11/2002 | Chesavage et al. |
| 2002/0198858 A1 | 12/2002 | Stanley et al. |
| 2003/0033308 A1 | 2/2003 | Patel et al. |
| 2003/0135514 A1 | 7/2003 | Patel et al. |
| 2004/0015514 A1 | 1/2004 | Melton et al. |
| 2004/0187020 A1 | 9/2004 | Leerssen et al. |
| 2004/0220979 A1 | 11/2004 | Young et al. |
| 2004/0236769 A1 | 11/2004 | Smith et al. |
| 2005/0114672 A1 | 5/2005 | Duncan et al. |
| 2005/0144198 A1 | 6/2005 | Bergstraesser et al. |
| 2005/0262107 A1 | 11/2005 | Bergstraesser et al. |
| 2005/0262165 A1 | 11/2005 | Scott et al. |
| 2006/0026567 A1 | 2/2006 | McVoy et al. |
| 2006/0080316 A1 | 4/2006 | Gilmore et al. |
| 2006/0242655 A1 | 10/2006 | Fernando et al. |
| 2007/0136382 A1 | 6/2007 | Idicula et al. |
| 2008/0112006 A1 | 5/2008 | Sambe et al. |
| 2008/0201339 A1 | 8/2008 | McGrew et al. |
| 2008/0222212 A1 | 9/2008 | Prasad et al. |
| 2008/0271047 A1 | 10/2008 | Rafnsson |
| 2009/0013401 A1 | 1/2009 | Subramanian et al. |
| 2009/0024609 A1 | 1/2009 | Barker et al. |
| 2009/0282492 A1 | 11/2009 | Takahashi |
| 2010/0050272 A1 | 2/2010 | Tadayon et al. |
| 2010/0228834 A1 | 9/2010 | Hung et al. |
| 2010/0287208 A1 | 11/2010 | Mao et al. |
| 2011/0172838 A1 | 7/2011 | Pai et al. |
| 2011/0225119 A1 | 9/2011 | Wong et al. |
| 2012/0089610 A1 | 4/2012 | Agrawal et al. |
| 2012/0185435 A1 | 7/2012 | Misra et al. |
| 2012/0304306 A1 | 11/2012 | Chamarty et al. |
| 2013/0159021 A1 | 6/2013 | Felsher |
| 2014/0136500 A1 | 5/2014 | Wong et al. |
| 2014/0189118 A1 | 7/2014 | Hunter |
| 2014/0351213 A1 | 11/2014 | Rundle et al. |
| 2015/0205823 A1 | 7/2015 | Rundle et al. |
| 2015/0205831 A1 | 7/2015 | Rundle et al. |
| 2015/0205832 A1 | 7/2015 | Rundle et al. |
| 2015/0205977 A1 | 7/2015 | Rundle et al. |
| 2015/0242521 A1 | 8/2015 | Hunter |
| 2016/0179873 A1 | 6/2016 | Scheevel et al. |

OTHER PUBLICATIONS

European Search Report Issued in European Application No. 15737109.7 / International Application No. PCT/US2015/011325 dated May 31, 2017; 10 Pages.

International Search Report and Written Opinion Issued in International Application No. PCT/US2015/011322 dated Mar. 20, 2015; 10 Pages.

International Search Report and Written Opinion Issued in International Application No. PCT/US2015/011323 dated Mar. 27, 2015; 9 Pages.

International Search Report and Written Opinion Issued in International Application No. PCT/US2015/011325 dated Mar. 27, 2015; 8 Pages.

International Search Report and Written Opinion Issued in International Application No. PCT/US2015/011327 dated Mar. 27, 2015; 9 Pages.

Leach et al.; "A Universally Unique IDentifier (UUID) URN Namespace"; The Internet Society; Jul. 2005; 30 Pages.

Lenz et al.; "A Practical Approach to Process Support in Health Information Systems"; Journal of the American Medical Informatics Association; vol. 9, No. 6; Dec. 2002; pp. 571-585.

Nadkarni et al.; Metadata-Driven Software Systems in Biomedicine; Designing Systems that can Adapt to Changing Knowledge; May 11, 2017; 20 Pages.

Peckham et al.; "A Component-Based Approach to Integrated Modeling in the Geosciences: The Design of CSDMS"; Computers & Geosciences 53; 2013; pp. 3-12.

A = Administrator
D = Duplicator
C = Contributor
R = Reader

| Project ABC | Compartments | | | |
|---|---|---|---|---|
| Levels | P | Q | S | T |
| Confidential | A | C | R | |
| Internal | C | R | | |
| External | R | | | |

80

| User Alice | Compartments | | | |
|---|---|---|---|---|
| Levels | P | Q | S | T |
| Internal | A | R | | |

82

| User Bob | Compartments | | | |
|---|---|---|---|---|
| Levels | P | Q | S | T |
| External | C | C | | |

84

| User Merlin | Compartments | | | |
|---|---|---|---|---|
| Levels | P | Q | S | T |
| Confidential | | | | A |

86

Project ABC Access: Alice = Contributor; Bob = Reader; Merlin = None

FIG.6

COMPARTMENT-BASED DATA SECURITY

CROSS-REFERENCE TO RELATED APPLICATION

This application is a continuation of U.S. application Ser. No. 14/595,763 filed Jan. 13, 2015, which claims the benefit of U.S. Provisional Application Ser. No. 61/927,042 filed Jan. 14, 2014, the entire disclosure of which are incorporated herein by reference.

BACKGROUND

Various processing tools are utilized in relation to energy industry operations and are used to perform tasks including data collection, storage, modelling and analysis. Data from various sources (e.g., measurement and analysis data from various well locations and regions) can be aggregated in a repository for access by numerous users. Data is typically accessible by numerous users at different locations.

Data security is conceptually simple. Only certain users, either humans or software agents, may have certain types of access to certain elements of data. For the single user and that user's private data, security largely remains a simple concept. The user's data is placed in files or other storage elements in machines that the user physically controls and those storage elements are secured against access by others. However, as soon as access to data must be shared and the storage of data is on systems outside the user's physical control, then security becomes complicated. In addition, when the storage of data involves enterprise-wide or global resources and access must be arbitrated among hundreds and perhaps thousands of users, security becomes even more complicated.

SUMMARY

An embodiment of a method for securing stored data includes assigning a first user security label to a first user. The method further includes adding an object compartment created by the first user to the first user security label assigned to the first user. The method further includes assigning the object compartment to an object created by the first user by creating the object compartment in an object security label. The method further includes enabling a second user to access to the object created by the first user by assigning the object compartment assigned to the object to a second user security label of a second user. The method further includes determining, by a processing device, whether to permit the second user to access to the object based at least in part on the object security label and the second user security label.

An embodiment of a system includes a memory comprising computer readable instructions and a processing device for executing the computer readable instructions for performing a method for securing stored data. An example method for securing stored data includes assigning a first user security label to a first user. The method further includes adding an object compartment created by the first user to the first user security label assigned to the first user. The method further includes assigning the object compartment to an object created by the first user by creating the object compartment in an object security label. The method further includes enabling a second user to access to the object created by the first user by assigning the object compartment assigned to the object to a second user security label of a second user. The method further includes determining, by a processing device, whether to permit the second user to access to the object based at least in part on the object security label and the second user security label.

BRIEF DESCRIPTION OF THE DRAWINGS

Referring now to the drawings wherein like elements are numbered alike in the several Figures:

FIG. 6 illustrates exemplary security labels for objects and users in a multi-user object storage system.

DETAILED DESCRIPTION

Apparatuses, systems, methods and computer program products are provided for securing data stored in a computing and/or storage device, and/or a network of devices. A data security scheme is provided that presents a superior way of handling data security that effectively scales from a single user to a multi-user system while preserving all or a significant amount of the conceptually simple data security environment of a single user and that user's data. In one embodiment, a network or other multi-user system (e.g., a central data storage or repository) utilizes user-created compartments that are stored in security labels. The security labels are assigned to both data stored in the system (e.g., objects or collections of objects), and to individual users. Each user in the system is able to secure his or her own data object by defining access rights and levels to the object in an object security label and in security labels assigned to individual users.

While embodiments are detailed below with specific reference to distributed objects for explanatory purposes, alternate embodiments apply, as well, to other multi-version environments.

Figure 1:
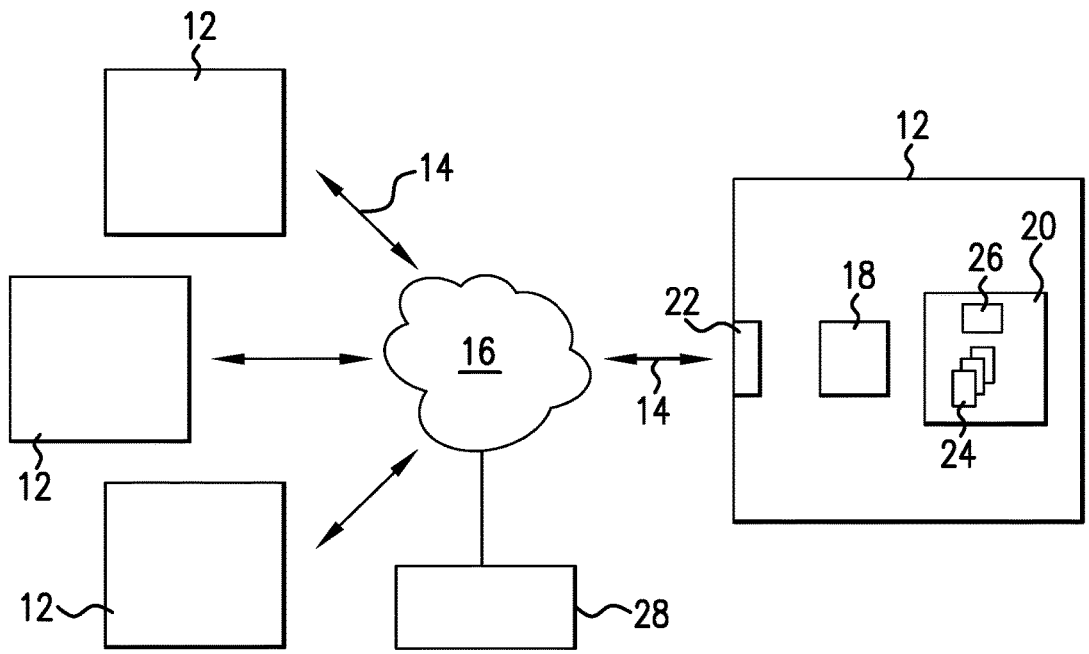
FIG. 1 is a block diagram of an embodiment of a distributed data storage, processing and communication system.

FIG. 1 is a block diagram of a distributed data storage, processing and communication system 10. The system 10 includes a plurality of processing devices or nodes 12. The nodes 12 each have computing components and capabilities, are connected by links 14, which may be local, virtual, wired or wireless. One or more of the nodes 12 may be connected via a network 16, such as the internet or an internal network. Each node 12 is capable of independent processing, and includes suitable components such as a processor 18, memory 20 and input/output interface(s) 22. The memory 20 stores data objects 24 or other data structures, and a program or program suite 26. The nodes may be computing devices of varying size and capabilities such as virtual machines, server machines, desktop computers, laptops, tablets and other mobile devices.

An exemplary program is an energy industry data storage, analysis and/or modeling software program. An example is JewelSuite™ analysis and modeling software by Baker Hughes Incorporated.

In one embodiment, the system includes one or more data storage locations. For example, the system 10 includes a centralized data repository 28. The repository 28 is accessible by each node 12. In one embodiment, the system 10 includes a Distributed Object Network, where each node 12 can access and be used to edit a distributed object, e.g., an object 24. Thus, users can independently retrieve copy and edit stored data. This independent editing may result in numerous different versions or copies of an object. As described herein, a "user" refers to a human or processing device capable of accessing and interacting with objects and/or data.

An object is a container for state information and also defines methods and properties that act on that state. An object type is a template that can be used to create an unlimited number of objects, which are initially identical, but become different as the object state changes.

In a distributed object system, some objects are transitory, derivative of other objects, or are otherwise of secondary importance to this discussion. Exemplary objects of interest are objects that map to real world objects, both physical and abstract, and together model the domain of interest. These objects are designated as domain objects. Objects may include any type of data for which storage and access is desired. For example, embodiments described herein are described in the context of energy industry or oil and gas data, but are not so limited.

Energy industry data includes any data or information collected during performance of an energy industry operation, such as surface or subsurface measurement and modeling, reservoir characterization and modeling, formation evaluation (e.g., pore pressure, lithology, fracture identification, etc.), stimulation (e.g., hydraulic fracturing, acid stimulation), drilling, completion and production. Exemplary domain objects in the oil and gas domain include fields, reservoirs, wells, geological grids, faults, horizons, and fluid contacts.

Examples of domain objects for energy industry data are wells and simulation grids. An example of an object that is not a domain object because of abstraction is a 3D view object that controls the view of an object, such as a subterranean reservoir data object. The state of the 3D view is serialized to an object file so that when the object file is reopened, the view of the reservoir is restored to the same viewing angle and zoom level. However the state of the 3D view object is irrelevant to the real world problem that is being analyzed, and thus this object is not considered a domain object. An example of an object that is not a domain object because of derivation is a well graphics object. The well graphics object implements rendering of a well domain object on the 3D view. The well graphics object contains no state of its own but accesses the state of the well domain object.

In a distributed object system, metadata provides a concise description of the object that can be distributed broadly while the actual data represents the complete object that is often very large and time consuming to move. The metadata is used to identify and/or provide information regarding an object, such as the object type, version, and parameters that the data in the object represents.

An Object Identifier ("Oid") is the globally unique identifier that is used to set each object or domain object apart. When an object or domain object of a particular type is created, a new Oid is generated for it. The Oid may be any suitable type of identifier. An exemplary identifier is a lightweight identifier such as a universally unique identifier (UUID) as specified in RFC 4122.

A Version Identifier ("Vid") is the globally unique identifier that is used to set each version of an object or domain object apart. When an object or domain object of a particular type is created, a new Vid is generated for it, representing the initial, default state of the domain object. As each new version of the domain object is created as a result of self-consistent changes to the state, a new Vid is generated. An exemplary identifier is a lightweight identifier such as a universally unique identifier (UUID) as specified in RFC 4122.

Figure 2:
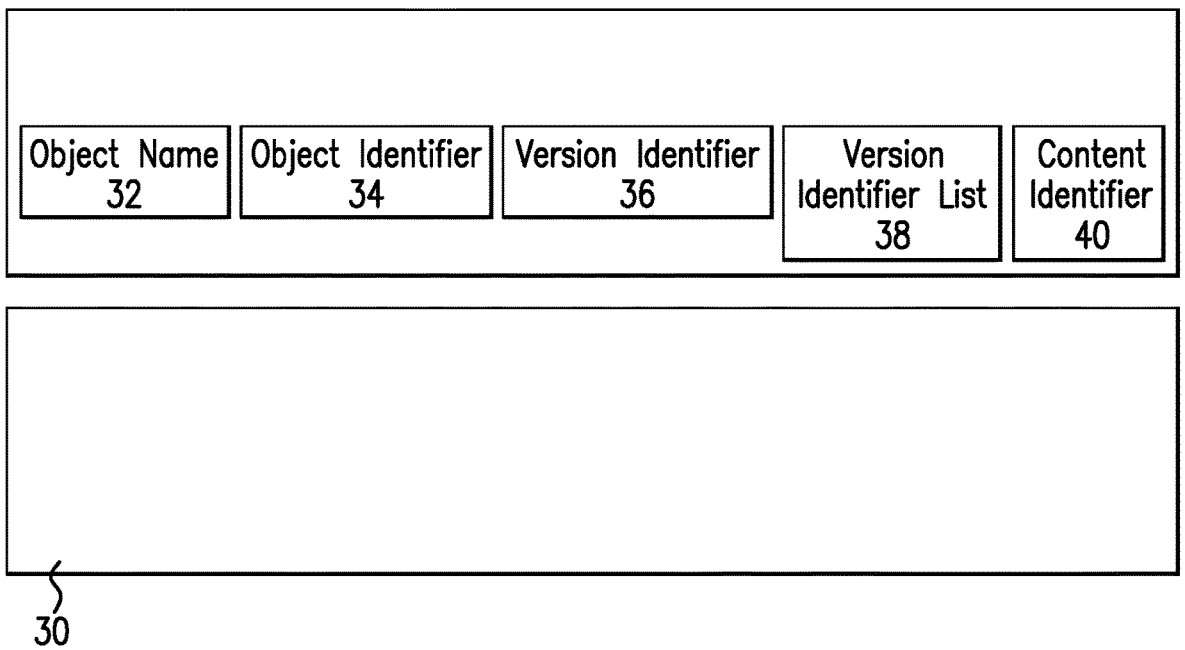
FIG. 2 illustrates identifiers and metadata associated with a data object stored in the system of FIG. 1.

Exemplary metadata that is associated with an object 30 is shown in FIG. 2. Such metadata is described as associated with a domain object, but may also be associated with any object or other data structure. Each object 30 may be imprecisely identified by a tuple (Name, Version Number), where "Name" is the object name 32, which may not be unique to the particular domain object 30, and "Version Number" may also not be unique to the domain object 30. Each object 30 may also be precisely identified by a tuple (Oid, Vid), where Oid 34 is an object identifier and Vid 36 is a version identifier. Each of the identifiers (Oid 34 and Vid 36) is universally unique such that, regardless of which user is editing an object 30, unrelated objects 30 will not have the same Oid 34 and two different edits of the same object 30 will not have the same Vid 36. All objects 30 resulting from the same initial object 30 will have the same Oid 34. However, when one object 30 stems from another, the two objects 30 will have a different Vid 36. Thus, the tuple (Oid, Vid) is unique for each non-identical object 30. The metadata may also include a list of all Vid 36 associated with that object 30, shown in FIG. 2 as a Version identifier List or "VidList" 38. This allows any two object identifiers to be compared to determine the object kinship (e.g., unrelated, identical, ancestor, descendant, or cousin). The metadata may also include a Parent Version Identifier ("ParentVid"), which connects or relates the VidList 38 to each version and associated Vid 36. The ParentVid indicates the previous version of a particular version of an object, i.e., the version of the object that was edited or otherwise use to create the particular version.

Identification of object kinship can be achieved using a baseline, which is a snapshot or reference list of objects at a given time. Each user and/or processing device may maintain a baseline, and, when a user runs the program generated with the distributed objects, baselines are merged and reconciled. The baseline and object identification process is described in U.S. Publication No. 2014/0351213, published Nov. 27, 2014 (application Ser. No. 13/898,762 filed May 21, 2013), the contents of which are incorporated herein by reference in its entirety.

As described herein, "metadata" may refer to all data structures associated with an object that are not the data set (referred to as "actual data") that is stored as the object. For example, metadata may refer to the object name, identifier, version identifier and the version identifier list. In other example, metadata may be described separate from the object identifier, such that a representation of an object can include the object identifier, metadata and/or the actual data. The object identifier and/or the metadata can thus be accessed, transmitted and stored independent of the data set while maintaining a relation to the data set.

For each node of the distributed object system, a mechanism is provided to organize the metadata for all objects represented on that node. An exemplary mechanism includes an entity-attribute-value (EAV) organizational scheme. A data model for the metadata includes related tables or other data structure for object identification, parameter or attribute identification, and for parameter values. This scheme can be used for energy industry data or any other kind of data.

Figure 3:
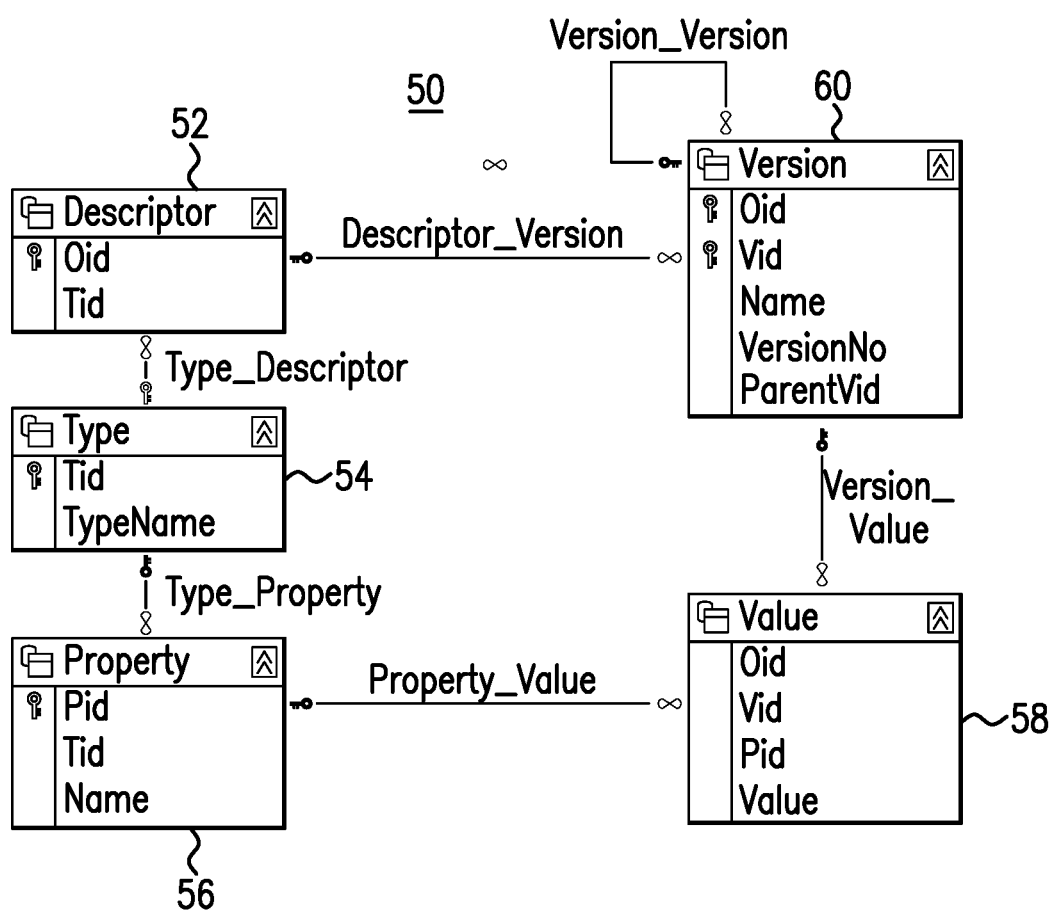
FIG. 3 is a diagram illustrating an embodiment of a data model for storing and organizing identifiers and metadata associated with a data object.

FIG. 3 shows an example of an organization scheme for metadata that may be applied to oil field data and other energy industry data. A data model is shown that employs an entity-attribute-value ("EAV") approach, which is extensible in that new or modified domain object definitions can be easily added to an existing repository without redesign or reloading of the data.

tor table 52 is a parent of the Version table 60, which is a parent of the Value table 58. The Property table 56 is also a parent of the Value table 58. The Type table 54 is a parent of the Descriptor table 52 and the Property table 56. The Version table 60 is a parent of itself and has a Version_Version relation which couples the ParentVid to the Vid.

The following table describes each element in the schema of FIG. 3:

| Element | Description |
| --- | --- |
| Descriptor Table | Includes one row for each domain object in the repository. |
| Version Table | Includes one row for each version of a domain object in the repository |
| Type Table | Includes one row for each type of domain object in the repository. |
| Property Table | Includes one row for each property of a domain object type |
| Value Table | Includes the value associated with the property for a specific version of a domain object. |
| Oid Column | The object identifier. Uniquely indicates a domain object. |
| Vid Column | The version identifier. The tuple (Oid, Vid) uniquely identifies a specific version of a domain object. Fully described in [1]. |
| Tid Column | The type identifier. Uniquely indicates a type of domain object. This is a UUID. |
| Pid | The property identifier. Uniquely indicates a property of a type of domain object. This is a UUID. |
| Name Column | The name of the domain object. |
| VersionNo Column | The version number of the domain object. The tuple (Name, VersionNo) is non-unique while tuple (Oid, Vid) is unique. This concept is described in [1]. |
| ParentVid Column | The Vid of the previous version, or empty (null) if the row represents the initial version of the domain object. |
| TypeName Column | The name of the type. |
| PropertyName Column | The name of the property. |
| Value Column | Includes the value for a property for a specific version of a domain object. |
| Descriptor_Version Relation | Specifies the versions of a domain object. |
| Type_Descriptor Relation | Specifies the domain objects that are of a type. |
| Type_Property Relation | Specifies the properties for a specific type. |
| Property_Value Relation | Specifies the values that are specified for a specific property. |
| Version_Value Relation | Specifies the values that are specified for a specific version of a domain object. |
| Version_Version Relation | Specifies the previous version of a version of a domain object. |

FIG. 3 shows the relational schema that implements the EAV data model. Embodiments may include all of the blocks or tables shown in FIG. 3 or a subset thereof. Each block in the diagram 50 shown in FIG. 3 represents a relational table, which may be stored in a database or repository and accessible by a node. Each entry in the block represents a column in the table. A descriptor table 52 (the "entity" of the EAV model) includes an Oid column for storing the unique identifier for an object and a Type identifier ("Tid") column for storing an indication of the object type. A type table 54 includes the Tid and a Type Name column. A Property or parameter table 56 (the "attribute" of the EAV model) includes a Property identifier ("Pid") column, a Tid column and a Property Name column. A Value table 58 includes an Oid column, a Value identifier ("Vid") column for storing the Vid, a Pid column and a Value column for storing the actual property value. A Version table 60 includes Oid, Vid, Name, Version number and ParentVid columns.

Figure 4:
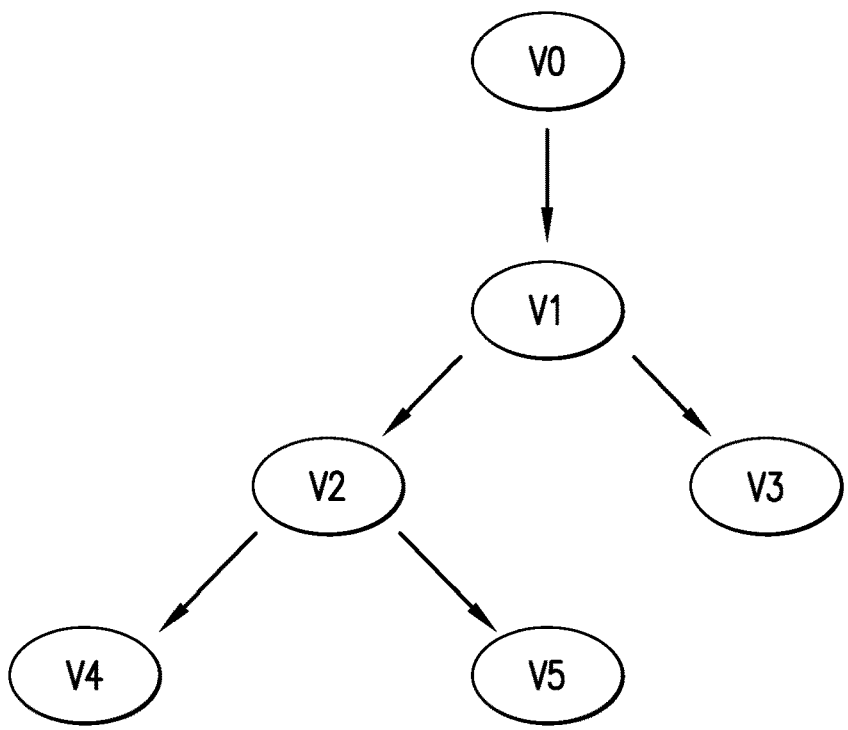
FIG. 4 illustrates exemplary relationships between versions of a data object.

The lines between blocks represent one-to-many relations between the rows of one table and the rows of another table. The relations are from parent to child table. A key symbol designates the parent or "one" side of the relation and an infinity symbol designates the child or "many" side of the relation. In other words, a row in the parent table specifies zero or more rows in the child table. As shown, the Descrip- As discussed above, the ParentVid indicates the previous version of a particular version of an object. Because users can independently and potentially simultaneously access and edit data, the versions of an object may not necessarily follow a linear or chronological progression. For example, as shown in FIG. 4, if multiple users access and separately edit and save new versions of an object from the same previous version, the resulting set of versions forms a bifurcating tree of object versions.

The ParentVid, which associates each version with a parent version from which the version was created, allows this tree of object versions to be represented in a flat version table. For example, FIG. 4 illustrates that two users created separate versions (V2 and V3) from a previous version (V1), and two separate versions (V4 and V5) were created from the same previous version V2. Using the ParentVid, the relationships between versions can be represented in a version table as follows:

| Version Table | | | | |
| --- | --- | --- | --- | --- |
| Oid Column | Vid Column | Name Column | VersionNo Column | ParentVid Column |
| O1 | V0 | Object A | 1 | (Empty) |
| O1 | V1 | Object A | 2 | V0 |

-continued

Version Table

| Oid Column | Vid Column | Name Column | VersionNo Column | ParentVid Column |
|---|---|---|---|---|
| O1 | V2 | Object A | 3 | V1 |
| O1 | V3 | Object A | 3 | V1 |
| O1 | V4 | Object A | 4 | V2 |
| O1 | V5 | Object A | 4 | V2 |

The corresponding VidList (essentially a path from the root in this example) for each leaf of the tree can be represented as:

$$V3=(V0,V1,V3)$$

$$V4=(V0,V1,V2,V4)$$

$$V5=(V0,V1,V2,V5)$$

Any of various organizational schemes can be used to store and organize metadata, and are not limited to the embodiments described herein.

Figure 5:
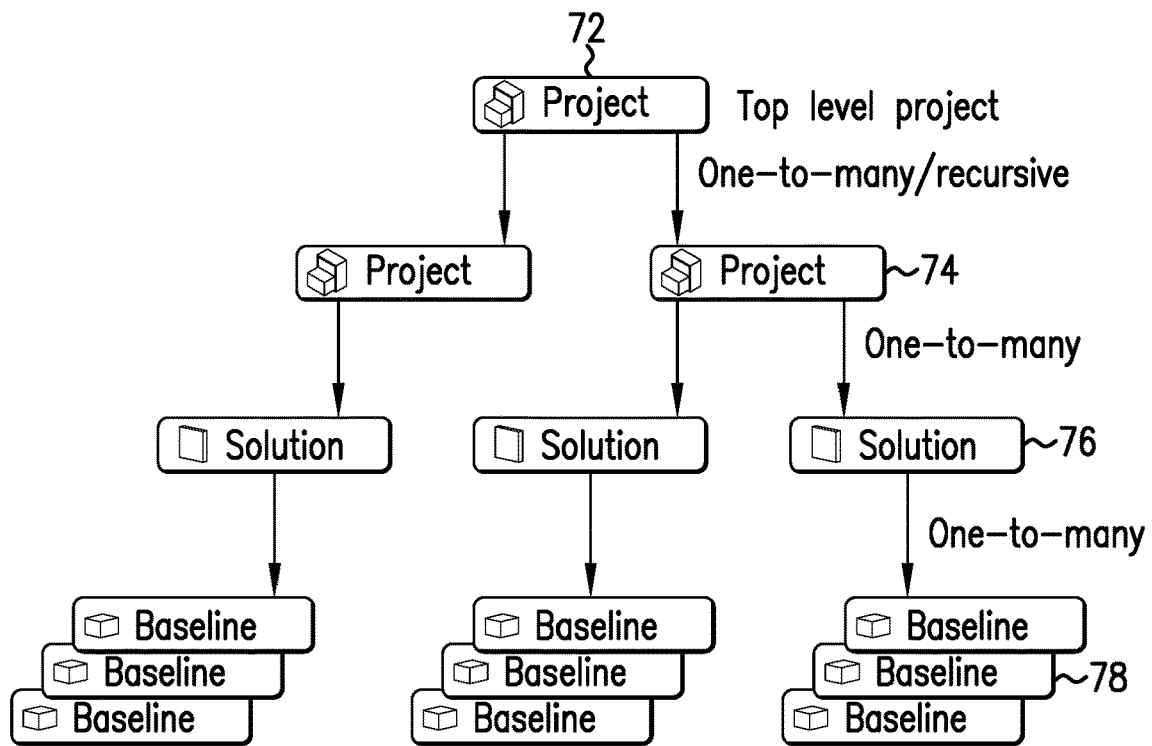
FIG. 5 illustrates an architecture for a multi-user data storage system.

FIG. 5 illustrates examples of objects, baseline containers, baselines and their relationships. The specific types of objects and files, the configuration and the software described are not limited to that shown in FIG. 5.

A baseline container is a data construction in which a collection of objects resides. The baseline container forms a boundary around one or more objects. In one embodiment, every baseline must exist within a baseline container. Containers can be nested but do not overlap.

There may be any number of types of baseline containers, which can be given names that are meaningful to users. For example, as shown in FIG. 5, an architecture describes baseline containers named "project" and "solution", which include objects related to energy industry operations and data. It is noted that embodiments described as being applied to or including objects are considered to be applicable to both domain objects and other types of objects.

FIG. 5 shows an exemplary architecture 70 compatible with analysis software such as JewelSuite™ software. The architecture 70 provides for a top level project container 72, which is a parent of one or more individual project containers 74. Each project container 74 is a parent of one or more "solution" containers 76. Each solution container 76 may be in any suitable form (e.g., a table) and stored in a suitable format, such as a disk file, that contains a complete and self-consistent set of one or more objects that can be opened with the software.

Each baseline 78 is a subgrouping of objects within a solution container 76 that have the characteristic of being self-consistent at a specific time, the time when the container was saved and the baseline was created. Other baselines in the same container contain most of the same objects as members.

Individual objects can be copied from one solution container to another. At the moment the solution container is saved, a new baseline is created that references the copied object and all of the other objects that are part of the loaded solution.

Both the baseline container and each baseline may be uniquely identified with universally unique identifiers (UUIDs), referred to for example as "SolutionId" and "BaselineId." As UUIDs are typically not displayed to a user, a baseline identity may be displayed as a solution name and version number. As with the (Oid, Vid) tuple, the (Name, VersionNo) tuple identifying a solution and baseline is an approximation, while the (SolutionId, BaselineId) tuple is precise.

Each project container 74 can include one or more solutions, objects and/or other projects. For example, the project container 74 may include a grouping of solution containers 76 and/or other projects. In one embodiment, the project containers are hierarchical: a project container can have at most one parent project container. There can be any number of child project containers within a project container, and projects can be nested to any depth. Project containers which have no parent container are known as top level projects (e.g., project container 72).

A solution container is stored in only one project. A solution container can be copied from one project to another, but the newly created solution container is given a different UUID (e.g., SolutionId). A project container has a name and a path, which can be established to the project from the top level project, in the same manner that a path to a file folder can be established from the root folder. A project may also have a UUID, called for example the "ProjectId". Like the solution, the name is not necessarily unique, but the ProjectId is. Like a file folder path, the project path must resolve to a single project. This does not mean that a file folder path always resolves to the same project, since projects, like file folders can be moved.

As shown above, a domain object or baseline container (e.g., project or solution container) is not a baseline. An object can be part of many baselines which can overlap in various ways. A baseline can be a member of only one baseline container. The domain objects to which a baseline refers are not constrained by any container and may be considered part of the general population of domain objects that comprise the distributed object system. While it is common to say that an object is in a container, in precise terms this means that the container contains a baseline which has a reference to the object.

Once data moves beyond the single user into a multi-user or enterprise environment that provides shared resources, data objects must be made secure to prevent unauthorized modification of the data.

An embodiment of a security scheme, referred to as "compartment-based security," attaches security labels to both data elements (e.g., objects, baselines, projects, solutions, etc.) and users. A data object (or other structure) modified or produced and saved by a user is assigned a compartment, which is stored in a security label for each of the object and the user. The compartment is self-administered, that is each user is responsible for securing his or her own data. Whereas system-wide there is still a complex tapestry of security label combinations, at the user level, the security level combinations are very small and manageable. As described herein, a "user" may be a human who is granted access to objects or other data, and/or a processing device such as a software agent.

The compartment-based security described here allows user to implement their own security. Users thus secure their own data and decide who can use it, by providing a compartment associated with the data and stored in user security labels. There is no limit to the number of compartments that can be created to secure data owned (i.e., controlled) by a user, and likewise no limit to the number of users that can be given security access by the owner. Each compartment includes a well understood set of options for controlling access.

In one embodiment, user secured data is not a barrier to enterprise data administration or corporate governance. For example, an IT specialist will always be able to access all the data in compartments by extracting the raw data from the low level tables. This type of access is exceptional and should be carefully considered and implemented, so that under normal circumstances users can be confident that their data is secure.

Compartment-based security features include a security label assigned to each object or collection of objects (e.g., a project), and a security label assigned to each user in a network or other multi-user computing system. The security label may be stored as part of the metadata associated with an object, or separately stored in the system and related to the object. For purposes of discussion, objects as described herein may include individual objects or domain objects, one or more objects in a container, and/or a collection of objects.

Each compartment is created and administered by a user when the user stores an object, e.g., after accessing and amending the object and saving a new version of the object. In one embodiment, the compartment is associated with an object and version.

Each compartment is self-administered and managed by the user that created it. There can be an unlimited number of compartments. The compartments are identified by name, for example "TEAPOT DOME" or "2013 STUDY". Since there can be an unlimited number of compartments, the compartment names should be descriptive. There is no danger of collision of compartments through names because compartments are uniquely identified by UUID. Thus, if two users have compartments named "2013 STUDY", there is no collision because the compartments are still different and uniquely identified by the system. The only time the same name could be confusing is when users create the same names and share them. This confusion only occurs at the display level because the security logic is using only the UUIDs and there is no chance of confusion. The confusion can be eliminated at the user level by simply renaming the compartment which will have no effect on prior use of the compartment.

Compartments are created by users as needed. For every user a default compartment (e.g., called PRIVATE) is created. By definition, the user has full access to this compartment. This compartment cannot be shared unless the user explicitly provides access to the compartment to other users. This implies that all data that the user creates cannot be shared by anyone, unless the user explicitly shares it as described herein. The compartment for a given object is stored in both the security label for the corresponding object and the user's security label. The compartment defines security characteristics of the object, by defining, for example, levels and/or access rights that define the type of operations that a given user can perform on the object.

A user is determined to have some level of access to a data set if both the user security label associated with the user and a security label associated with the data set (e.g., an object or project security label) belong to the same compartment. By resolving the user and data set security labels, it can be determined whether both the user and data set security labels include a common compartment. If a common compartment is found, the user is determined to have access to the data set. The level and/or type of access can be determined based on the contents of the common compartment.

Aspects of the security labels are described in conjunction with exemplary security labels shown in FIG. 6. FIG. 6 illustrates an exemplary security label 80 for a project, which is entitled "ProjectABC". A ProjectABC container (not shown) is stored in a location (e.g., data repository) to which multiple users have access. In this example, the users are named "Alice", "Bob" and "Merlin". User security labels 82, 84 and 86 are assigned to Alice, Bob and Merlin, respectively. Such labels may be automatically constructed and assigned in response to users signing into a data system.

Each security label includes a compartment that defines the level and/or type of access that a user has to a given object or container, and thereby defines what operations a user can perform on the object associated with the compartment. For example, the compartment defines "access levels," which are hierarchical security levels that can be granted to an object or user. Any type and number of access levels can be used, and are not limited to those described herein. A minimum list of access levels could be, for example, "No Access" and "All Access." Other exemplary levels include "No Access", "External", "Internal" and "Confidential".

For example, FIG. 6 shows multiple compartments P, Q, S and T, each of which is assigned to a specific object within the ProjectABC. Multiple access levels are defined and may be assigned to a compartment. The access levels defined for Project ABC are "Confidential," "Internal," and "External." As shown, Compartment P has three access levels, Compartment Q has two access levels, and so on.

Each compartment may also define specific access rights that can be assigned to an object and a user. The access rights determine what types of actions a user might perform on an object. Any types and numbers of access rights can be used, and are not limited to those described herein. A minimum list could be, for example, "Nonentity" and "Administrator". Other exemplary access rights include "Nonentity", "Reader", "Contributor", "Duplicator" and "Administrator". Access rights are hierarchical, i.e. each element of the list allows a superset of actions permitted by the previous item on the list.

For example, multiple possible access levels are defined, including Administrator ("A"), Duplicator ("D"), Contributor ("C") and Reader ("R"). The security label 80 defines four access levels (A, D, C and R) that can be applied to a compartment.

Thus, in the example of FIG. 6, the ProjectABC container has access defined for three levels and three compartments. Alice has contributor rights because she has internal ADCR access to compartment P but is only allowed CR access on the internal level. Bob has only reader rights on the project through compartment P, because R is the highest access right permitted for an external level user. Finally, Merlin has no access at all to the project even though he has a confidential access level since he has no rights on any of the compartments for which access to the project is defined.

In one embodiment, the security label can be represented as a text string in two different forms, internal and display representation. An internal security label representation can be converted into a display form.

In one embodiment, each form has the syntax of a tuple:

$$(C1{=}L1A1{+}L2A2{+}L3A3, C2{=}L1A2{+}L2A2{+}L3A2, C3{=}L1A3{+}L2A3{+}L3A3, \ldots ),$$

where C1, C2, C3 are compartment names, L1, L2, L3 are access levels, and A1, A2, A3 are access rights. The ellipses indicate that the list can be extended without practical limit.

Each element of the form C=Aa+Bb+Cc is a security label clause that specifies a single compartment and the access rights (a, b, c) for each access level (A, B, C) for that compartment using some system of abbreviations.

The security label clauses in this embodiment are separated by commas and the entire list of elements is enclosed in parentheses. Space characters are insignificant except within compartment names. If there is no access for a particular access level, that label component can be omitted. If there are no access rights for any access level then the clause is simply the compartment name by itself.

An example of the display representation of a security label is (PUBLIC=XR), which indicates a label that permits external read access to the PUBLIC compartment. The internal string representation of the same label is:

(93E66163-56D4-4A7C-B92E-2A6E5ABC5B7C=001).

Thus the internal label is simply the UUID presentation of the compartment name. This is followed by an equal sign and digit strings that map onto specific access levels and rights.

Ownership has a very narrow but important role in compartment-based security. The owner is normally the creator of a domain object and therefore defines the security label for the object. Normally, a security label is not defined as each object is created. The user sets a security label for the baseline container in which the new or modified object will reside and this security label is applied to each object in the container that is created or modified.

Access cannot be completely denied to the owner of an object. If all access is removed, the owner can simply add it back. Ownership can be transferred for an object, e.g., by a "take ownership" action.

Figure 7:
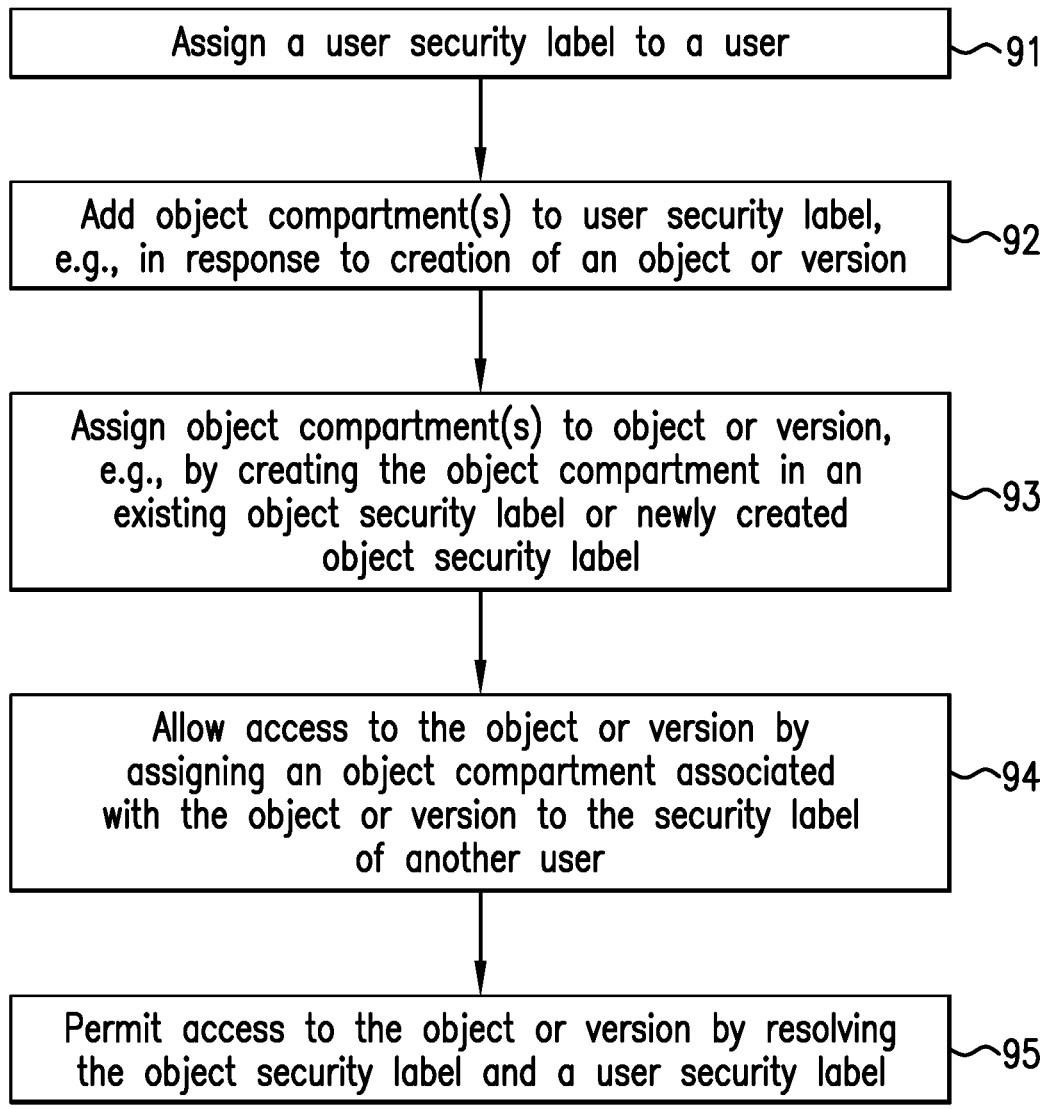
FIG. 7 is a flow diagram depicting an exemplary embodiment of a method of securing stored data in a multi-user storage system.

FIG. 7 shows an embodiment of a method 90 of securing data stored in a multi-user system. The method 90 may be performed on any suitable processor, processing device and/or network, such as the system 10 or components thereof. The method 90 includes one or more stages 91-95. In one embodiment, the method 90 includes the execution of all of stages 91-95 in the order described. However, certain stages may be omitted, stages may be added, or the order of the stages changed.

In the first stage 91, a user is assigned a security label. The label may be assigned as part of the authentication process for a system. For example, the user is assigned a label explicitly by an administrator or inherits one as a result of being a member of a role-based security group.

In the second stage 92, any new object compartments created by the user are added to the initial security label. For example, if the user saves a new object or modifies an existing object and creates a new version of the object, a compartment associated with the new object or version is added to the user security label. By default the user's access levels and rights to newly created compartments are the highest possible. The user might lower these access levels and rights. The user can only change access levels and rights to the compartments that that user owns. Therefore the user cannot raise access levels or rights to the compartments that that user inherited as part of authentication.

In the third stage 93, the new object compartments are assigned to objects created by the user. For example, an object compartment associated with the new object or new version is added to a security label assigned to the new object or version.

Objects or projects (collections of objects) are assigned security labels at their creation. As the result of an operation on the object by a user, a new security label is created and an object compartment added to the new security label, or the object compartment is added to an existing security label if the object is stored in an existing container. If an object is created, the compartment assigned to the new object will be the result of a label resolution between the container in which the object is to be created and the user. For the user to perform any actions at all on objects in one or more existing baseline containers, the user must have been granted access to the one or more baseline containers. For example, the user must have access to a baseline container secured with that user's PRIVATE (or otherwise named) compartment label and which has the user as the owner.

In the fourth stage 94, to share data in a controlled manner, the user creates compartments and adds users as members of the compartments. For each compartment member, access level and access rights can be defined. Then the user adds the new compartment to the security label to the object. Any individual user's access to an object is determined by resolving the user's security label against the objects. In order to have any type of access at all, both the subject's and the object's security label must have compartments in common.

For example, if the user that owns an object (referred to as the owner) desires to permit access to the object by a second user, the owner creates a new compartment that is associated with the object compartment in a project security label. The owner selects the access rights and levels to be given to the second user. The selected access rights and levels are defined in the new compartment, and the new compartment is stored in the second user's security label.

In the fifth stage 95, when a user (e.g., the user that is the owner of an object or a user that has been granted access to the object) intends to perform an operation on an object, the effective label for the operation is resolved by combining the user security label and the object security label. The resulting label must be compatible with the operation or else the operation fails. This resolution occurs in the following steps.

In the first step, the common compartments in the two security labels (user and object) are aggregated. If there are no common compartments, then the operation fails. For example, if user Bob intends to perform an operation such as adding content to the object associated with Compartment P, the common compartments (Compartment P) of the security label 80 and Bob's security label 84 are aggregated.

In the second step, if common compartments are found, the access level is determined by resolving the access levels in the compartments. This resolution may be performed by selecting the lower of the maximum access level permitted by the two compartments (the minimum of the user and object access level). For example, the common compartments (Compartment P) of the security label 80 and 82 are compared, and it is determined that Bob has an external access level, which provides access to the object as an external user.

In the third step, for the determined access level, the access rights are determined by resolving the access rights in the compartments. This resolution may be performed by selecting the lower of the maximum access rights that are permitted in both compartments (the minimum of the user and object access rights for the compartment and access level). For example, the Compartment P in the security label 80 provides up to Reader access rights for external users. Thus, even though Bob's access rights are indicated as Contributor, he will only be given Reader access rights. If none of the compartments in the resulting label has the appropriate access rights for the operation then the operation fails.

The embodiments described herein provide numerous advantages. Embodiments described herein allow for providing a fine grain security that is not obtainable using other security schemes, such as role-based security and row-based security, while allowing for effective administration. For example, role-based security is simply not capable of sufficiently fine grain security. Row-based security is capable of finer grain security than role-based security, but simply cannot be effectively administered.

One prior art approach to data security is to put files containing the data on shared folders. These folders can then be secured such that only a restricted list of users can have access to them. Another approach is to put the data into a repository of some kind that is organized into tables, columns and rows. The repository, such as a relational database, has a separate set of login credentials and its own restricted list of users.

In role-based security, the role is the primary enabler of access. The security principals (e.g. human users or software agents) are classified according to role, and access is granted accordingly. In an enterprise with thousands of users, role-based security serves to simplify the management of security. The problem with role-based security is that it is impossible to implement security of the right granularity. Roles effectively coarsen the grain of the security where the need is to secure data at a fine grain.

Another type of security that seeks to implement fine grain security is called row-based security. This is a type of database security that allows the setting of a security label for each individual data element and for each individual user. The type of access that is allowed for any combination of data element and user is determined by evaluating the security label of the user against the security label of the data element. The problem with row-based security is administration: the number of possible combinations of security labels and the number of data elements and users to which they must be applied grows quickly beyond any database administrator's ability to manage security effectively.

The compartment-based security embodiments described herein address these problems, as they are capable of providing fine grain security while allowing for effective administration. For example, each compartment in compartment-based security is self-administered, so that security for the objects that are stored by individual users can be effectively managed, while a fine grain security remains system-wide.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A computer-implemented method for securing stored data, the method comprising:
   assigning a first user security label to a first user;
   adding an object compartment created by the first user to the first user security label assigned to the first user;
   assigning the object compartment to an object created by the first user by creating the object compartment in an object security label;
   enabling a second user to access to the object created by the first user by assigning the object compartment assigned to the object to a second user security label of a second user;
   determining, by a processing device, whether to permit the second user to access to the object based at least in part on the object security label and the second user security label; and
   permitting the second user to access the object responsive to determining that the object security label and the second user security label belong to the object compartment, wherein the second user is permitted to access the object defined by a level of access, the level of access being determined based at least in part on a user access level for the second user and an object access level for the object.

2. The computer-implemented method of claim 1, wherein the first user security label is assigned to the first user based at least in part on a role-based security group of which the first user is a member.

3. The computer-implemented method of claim 1, further comprising:
   preventing the second user to access the object responsive to determining that the object security label and the second user security label do not belong to the object compartment.

4. The computer-implemented method of claim 1, wherein the object compartment is associated with a globally unique compartment identifier.

5. The computer-implemented method of claim 1, further comprising:
   defining, by the first user, access levels and access rights to the object, and storing the access levels and access rights in the object security label.

6. The computer-implemented method of claim 1, wherein the object security label is stored as part of metadata associated with the object, the metadata including a globally unique object identifier that identifies the object and a version table having a relation to the globally unique object identifier, the globally unique object identifier in combination with a version identifier precisely identifying a particular version of the object.

7. The computer-implemented method of claim 1, wherein the object stores a data set that comprises data acquired in conjunction with an energy industry operation.

8. The computer-implemented method of claim 1, wherein the level of access is determined to be the lower of the user access level for the second user and the object access level for the object.

9. A system comprising:
a memory comprising computer readable instructions; and
a processing device for executing the computer readable instructions for performing a method for securing stored data, the method comprising:
assigning a first user security label to a first user;
adding an object compartment created by the first user to the first user security label assigned to the first user;
assigning the object compartment to an object created by the first user by creating the object compartment in an object security label;
enabling a second user to access to the object created by the first user by assigning the object compartment assigned to the object to a second user security label of a second user;
determining, by the processing device, whether to permit the second user to access to the object based at least in part on the object security label and the second user security label; and
permitting the second user to access the object responsive to determining that the object security label and the second user security label belong to the object compartment, wherein the second user is permitted to access the object defined by a level of access, the level of access being determined based at least in part on a user access level for the second user and an object access level for the object.

10. The system of claim 9, wherein the first user security label is assigned to the first user based at least in part on a role-based security group of which the first user is a member.

11. The system of claim 9, wherein the method further comprises:
preventing the second user to access the object responsive to determining that the object security label and the second user security label do not belong to the object compartment.

12. The system of claim 9, wherein the object compartment is associated with a globally unique compartment identifier.

13. The system of claim 9, wherein the method further comprises:
defining, by the first user, access levels and access rights to the object, and storing the access levels and access rights in the object security label.

14. The system of claim 9, wherein the object security label is stored as part of metadata associated with the object, the metadata including a globally unique object identifier that identifies the object and a version table having a relation to the globally unique object identifier, the globally unique object identifier in combination with a version identifier precisely identifying a particular version of the object.

15. The system of claim 9, wherein the object stores a data set that comprises data acquired in conjunction with an energy industry operation.

* * * * *